United States Patent [19]

Pachonik et al.

[11] Patent Number: 4,478,875

[45] Date of Patent: Oct. 23, 1984

[54] METHOD FOR THE PREPARATION OF REGENERABLE DIELECTRIC LAYERS THROUGH POLYMERIZATION OF GASES

[75] Inventors: Horst Pachonik, Taufkirchen; Gerhard Seebacher, Munich, both of Fed. Rep. of Germany

[73] Assignee: Siemens AG, Berlin and Munich, Fed. Rep. of Germany

[21] Appl. No.: 508,584

[22] Filed: Jun. 28, 1983

[30] Foreign Application Priority Data

Jun. 30, 1982 [DE] Fed. Rep. of Germany ....... 3224426

[51] Int. Cl.$^3$ ............................................... B05D 3/06

[52] U.S. Cl. ...................................... 427/41; 427/79; 427/407.1

[58] Field of Search .......................... 427/41, 79, 407.1

Primary Examiner—Bernard D. Pianalto
Attorney, Agent, or Firm—Herbert L. Lerner; Laurence A. Greenberg

[57] ABSTRACT

In the preparation of regenerable dielectric layers through polymerization of gases by means of a glow discharge, a siloxane or a silazane or a mixture of siloxanes and/or silazanes is blown into the region of the glow discharge in addition to monomeric perfluorohydrocarbons with the empirical formula $(CF_2)_n$ and/or the corresponding perfluorized cyclic alkanes.

5 Claims, No Drawings

METHOD FOR THE PREPARATION OF REGENERABLE DIELECTRIC LAYERS THROUGH POLYMERIZATION OF GASES

BACKGROUND OF THE INVENTION

1. Field of the Invention

The invention relates to a method for the preparation of regenerable dielectric layers through polymerization of gases by means of a glow discharge on a substrate, especially for the preparation of electric multi-layer capacitors, in which monomeric perfluoro-hydrocarbons having the empirical formula $(CF_2)_n$, wherein $n = 2$ to 10 and/or the corresponding perfluorized cyclic alkanes are blown into the region of the glow discharger.

2. Description of the Prior Art

DE-A No. 29 07 775 discloses a method for the preparation of dielectric layers of glow polymerisate, in which high temperature-resistant dielectric layers are prepared from starting monomers which are present in the form of a mixture of perfluorized hydrocarbon and unsubstituted dienes. The term monomer in this context means a molecule or a compound of relatively low molecular weight and simple structure which is converted into polymer form under the influence of a glow discharge by forming a bond with itself or similar molecules or compounds.

The glow polymerization is carried out at the pressure of about 0.2 to 2 mbar and a frequency of applied voltage of over 5 MHz.

The multi-layer capacitors mentioned at the outset are produced by generating on a substrate alternatingly thin, vapor-deposited or sputtered-on metal layers and the glow-polymer dielectric layers. It has been found, however, with the known high temperature-resistant dielectric layers, that they are sensitive to immersion soldering and can easily be damaged mechanically in the process. Those dielectric areas over which vapor-deposited or sputtered-on metal coatings have been applied are particularly critical.

SUMMARY OF THE INVENTION

It is therefore an object of the invention to provide a method for the preparation of immersion-solderable dielectric layers which not only withstand storage at temperatures between 250° and 300° C. for short periods of time without mechanical and electrical changes, but which also remain nearly unchanged under temperature shocks during immersion in a wave-soldering bath.

With the foregoing and other objects in view, there is provided in accordance with the invention a method for the preparation of regenerable dielectric layers through polymerization of gases by means of a glow discharge on a substrate, especially for the preparation of electric multilayer capacitors, in which a monomer selected from the group consisting of monomeric perfluoro-hydrocarbons having the empirical formula $(CF_2)_n$, wherein $n = 2$ to 10, and the corresponding perfluorized cyclic alkanes are blown into the glow discharge, the improvement comprising imparting to the dielectric layers resistance to cracking when subjected to immersion soldering by blowing a siloxane or a silazane or a mixture of siloxanes and/or silazanes into the glow discharge region along with the monomers.

Other features which are considered as characteristic for the invention are set forth in the appended claims.

Although the invention is illustrated and described herein as embodied in a method for the preparation of regenerable dielectric layers through polymerization of gases, it is nevertheless not intended to be limited to the details shown, since various modifications may be made therein without departing from the spirit of the invention and within the scope and range of equivalents of the claims.

The invention, however, together wth additional objects and advantages thereof will be best understood from the following description.

DETAILED DESCRIPTION OF THE INVENTION

According to the invention, this problem of mechanical and electrical changes is solved in the method mentioned at the outset by blowing a siloxane or a silazane or a mixture of siloxanes and/or silazanes into the region of the glow discharge along with the monomers.

Monomers with the empirical formula $(CF_2)_n$ which are advantageously used in the method according to the invention are perfluoridized propene, butene, hexene, octene or decene and as the corresponding perfluorized cyclic alkanes, perfluorized cyclobutane, cyclohexane, dimethylcyclohexane as well as siloxanes and/or silazanes with the following composition:
$CH_3(CH_3HSiO)_nSiH(CH_3)_2$ wherein $n = 2, 3, 4$ or 5;
$(CH_3)_3SiOSi(CH_3)_3$;
$CH_3[(CH_3)_2SiO]_nSi(CH_3)_3$ wherein $n = 2; 3, 4$ or 5;
$(CH_3)_3SiNHCH_3$;
$(CH_3)_3SiNHC_2H_5$;
$(CH_3)_3SiN(C_2H_5)_2$;
$[(CH_3)_3Si]_2NH$;
$[(CH_3)_3Si]_2NCH_3$;
$CH_3[(CH_3)_2SiNH]_nSi(CH_3)_3$ wherein $n = 2$ or 3;
$[C_2H_5(CH_3)_2Si]_2NH$ and
$[(CH_3)_3SiNH]Si(CH_3)_2$.

In a preferred embodiment, the amount of blown-in siloxanes and/or silazanes is 3 to 15 volume percent.

The dielectric layers prepared by the method according to the invention exhibit only a slight tendency to oxidation at higher temperatures and of particular significance, show no crack formation during immersion soldering.

To obtain flexible, temperature-resistant layers with good electrical properties, it is advantageous in a further embodiment of the invention to additionally blow into the glow discharge region dienes and/or alkenes and/or cycloalkanes.

For instance, dienes with the empirical formula $C_nH_{(2n-2)}$ having a molecular mass $\leq 82$ and preferably conjugate double bond such as 1,3 butadiene, 1,3 pentadiene, 2-methylbutadiene (1,3), 1,3 hexadiene, 2,4 hexadiene, 2-methylpentadiene (1,2), 2,3-dimethylbutadiene (1,3) are used. Examples of an alkene with the empirical formula $(CH_2)_n$ which can be used as one of the substances are butene, pentene, hexene, heptene, octene as well as a corresponding cyclo-alkane.

The foregoing is a description corresponding, in substance, to German application P 34 24 426.6, dated June 30, 1982, international priority of which is being claimed for the instant application, and which is hereby made part of this application. Any material discrepancies between the foregoing specification and the specification of the aforementioned corresponding German application are to be resolved in favor of the latter.

We claim:

1. Method for the preparation of regenerable dielectric layers through polymerization of gases by means of a glow discharge on a substrate, especially for the preparation of electric multilayer capacitors, in which a monomer selected from the group consisting of monomeric perfluoro-hydrocarbons having the empirical formula $(CF_2)_n$, wherein n=2 to 10, and perfluorized cyclic alkanes with 3 to 10 carbon atoms are blown into the glow discharge, the improvement comprising imparting to the dielectric layers resistance to cracking when subjected to immersion soldering by blowing a siloxane or a silazane or a mixture of siloxanes and/or silazanes into the glow discharge region along with the monomers.

2. Method according to claim 1, wherein the siloxane or the silazane are a compound selected from the group consisting of:

$CH_3(CH_3HSiO)_nSiH(CH_3)_2$ wherein n=2, 3, 4 or 5;
$(CH_3)_3SiOSi(CH_3)_3$;
$CH_3[(CH_3)_2SiO]_nSi(CH_3)_3$ wherein n=2, 3, 4 or 5;
$(CH_3)_3SiNHCH_3$;
$(CH_3)_3SiNHC_2H_5$;
$(CH_3)_3SiN(C_2H_5)_2$;
$[(CH_3)_3Si]_2NH$;
$[(CH_3)_3Si]_2NCH_3$;
$CH_3[(CH_3)_2SiNH]_nSi(CH_3)_3$ wherein n=2 or 3;
$[C_2H_5(CH_3)_2 Si]_2NH$ and
$[(CH_3)_3SiNH]Si(CH_3)_2$.

3. Method according to claim 2, wherein the amount of blown-in siloxane and/or silazane is 3 to 15 volume percent based on the total volume of monomer and siloxane and/or silazane.

4. Method according to claim 1, wherein a hydrocarbon selected from the group consisting of dienes, alkenes and cycloalkanes are additionally blown into the region of the glow discharge.

5. Method according to claim 2, wherein a hydrocarbon selected from the group consisting of dienes, alkenes and cycloalkanes are additionally blown into the region of the glow discharge.

* * * * *